Oct. 8, 1940.　　　V. J. PHILIPPS　　　2,216,890
MEASURING AND MIXING VALVE
Filed Dec. 1, 1939
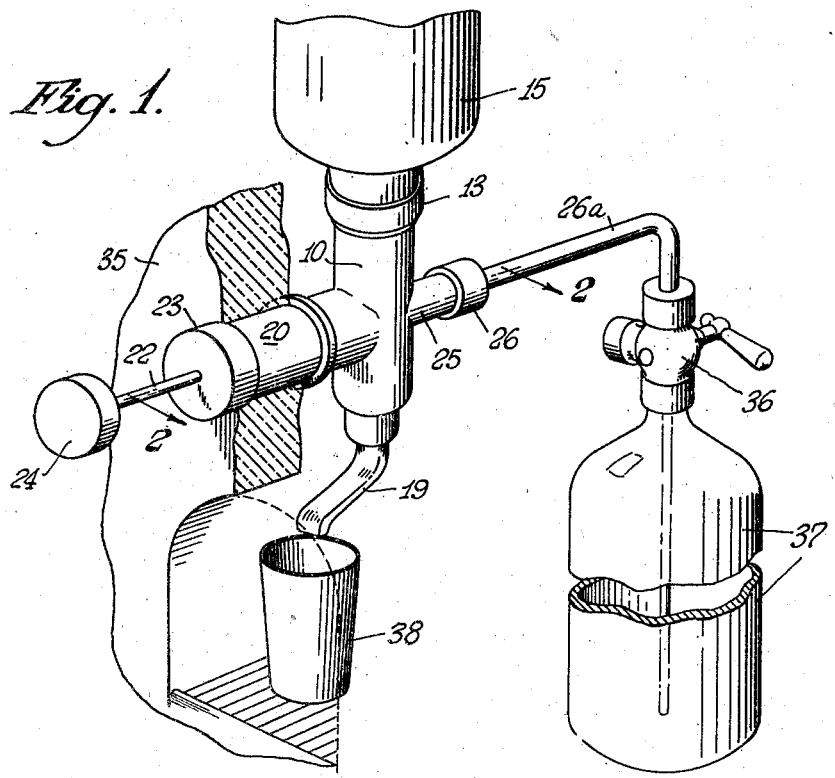
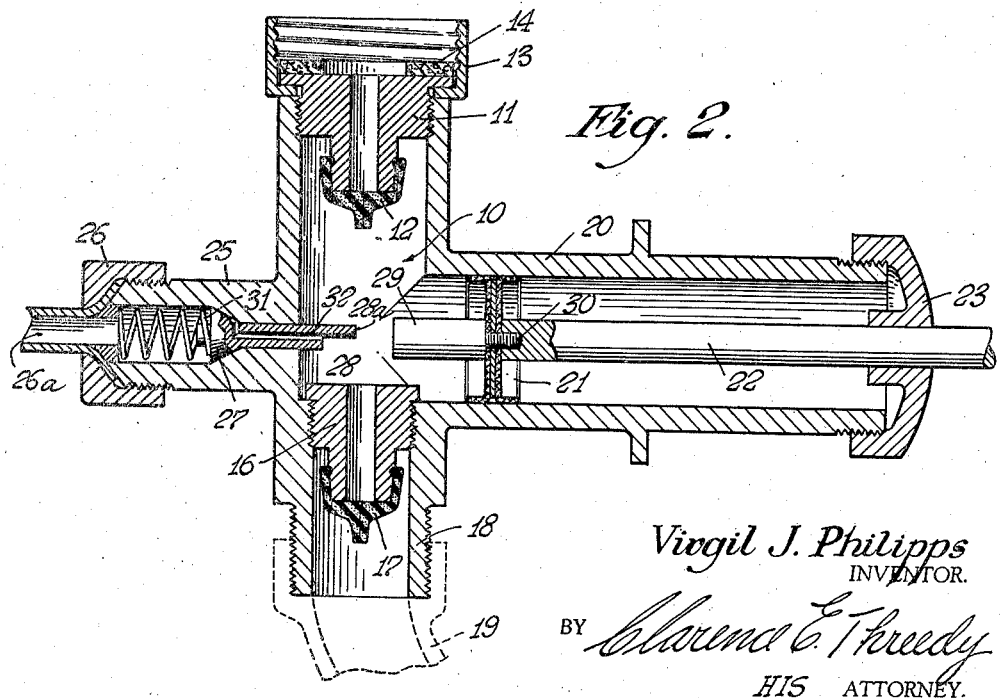
Virgil J. Philipps
INVENTOR.
BY *Clarence E. Threedy*
HIS ATTORNEY.

Patented Oct. 8, 1940

2,216,890

UNITED STATES PATENT OFFICE 2,216,890

MEASURING AND MIXING VALVE

Virgil J. Philipps, Chicago, Ill., assignor to A. Dalkin & Co., Chicago, Ill., a corporation of Illinois Application December 1, 1939, Serial No. 307,064

5 Claims. (Cl. 225—26)

This invention has as its principal object the provision of improvements in a mixing valve, said improvements including the arrangement of a pump with an operating member adapted to be moved in one direction to effect an influx of a measured amount of fluid into a mixing chamber, and when moved in the opposite direction to actuate valve means in a pressure line for admitting another fluid under pressure into the chamber, the mixed fluids being expelled from the chamber as a result of pressure from the pressure line.

Viewed from another aspect, it is an important object of the invention to provide a mixing valve suitable for use with machines for vending mixed drinks composed of a flavoring syrup and carbonated water, the valve being constructed for operation by a reciprocable control which actuates a pump movable in one direction to cause the influx of syrup into the valve, and movable in an opposite direction to open a valve in a pressure line to admit carbonated water under pressure for admixture with the syrup during the expulsion of the several fluids from the valve as a result of the pressure from the pressure line.

A more specific object is the provision of a mixing valve including a mixing chamber with an infeed valve adapted for connection with a syrup supply and an outfeed valve operable by pressure from within the mixing chamber, and a pressure line communicating with the chamber and provided with a normally closed pressure valve, together with a pump piston arranged to be reciprocated in said chamber to reduce the pressure within when moved in one direction so as to effect an infeed of syrup, said pump being arranged when moved in an opposite direction to engage and open the pressure valve, the combined fluids being expelled from the chamber through the outfeed valve as a result of the pressure built up in the chamber either by the influx of carbonated water under pressure alone or in combination with a locally built up pressure from the return stroke of the pump.

Other objects, advantages, and novel aspects of the invention reside in certain details of construction as well as the cooperative relationship of the component parts of the illustrative embodiment described hereinafter in view of the annexed drawing, in which:

Fig. 1 is a perspective view of the valve in use;

Fig. 2 is an enlarged vertical section taken along line 2—2 of Fig. 1.

In a preferred form of construction such as shown in Fig. 2, the valve consists of a T-shaped chamber generally indicated at 10 with a nipple 11 threaded into one branch and provided with a rubber flap type of infeed valve 12, the nipple being provided with a threaded coupling collar 13 and a seating washer 14 for engagement with the threaded neck of a syrup supply bottle 15 (Fig. 1).

On the discharge side of the valve, there is provided another nipple 16 threaded into an opposite branch of the chamber from the infeed nipple and provided with a similar rubber flap type of discharge valve 17 surrounded by an exteriorly threaded extension 18 of the valve housing for coupling with a discharge spigot 19.

Situated between the infeed and outfeed branches of the valve, is another extension 20 provided with a bore providing a pump cylinder in which is disposed for reciprocation a piston 21 attached to a reciprocable operating member or rod 22 passing through an end cap 23 at the end of the cylinder and provided with an operating handle 24 (Fig. 1).

Approximately opposite the pump extension 20 is an integral nipple or stud portion 25 threaded to receive a coupling 26 from a pressure line supplying carbonated water or other fluid under pressure to the valve. Within the nipple or stud portion 25 is a bore communicating with the pressure line and tapered at its inner end to provide a seat for a conical valve piece 27 having a stem 28 which projects into the mixing chamber approximately opposite an extension 29 on the pump operating rod. For convenience, the extension 29 is simply a stud with a threaded portion 30 passing through openings in the piston assembly and threaded into the end of the operating rod 22.

The pressure valve is normally closed by action of a spring 31 in the bore in the stud, there being an injection passage 32 formed in the stem 28 and communicating from a side of the valve head 27.

One application of the valve is illustrated in Fig. 1 wherein the pump is installed on the panel 35 of a device such as a vending machine, with the handle portion 24 accessible exteriorly of the machine for manipulation by the public, preferably in conjunction with a suitable form of coin control, the principal parts of the valve being disposed interiorly of the machine and inaccessible to the public, for connection with sources of fluid supply. For example, the container 15 is intended to contain a quantity of flavoring syrup, it being intended that in this construction the container 15 is supported by the valve itself. The pressure side of the valve is connected by a conduit 26a through a cut-off valve 36 to a supply drum 37 containing carbonated water under considerable pressure.

In the operation of the valve thus arranged, a container 38 is automatically or otherwise positioned beneath the spigot 19, and the operator grasps the handle 24 and withdraws the pump piston 21, thus reducing the pressure within the mixing chamber and causing an amount of syrup to enter through the infeed valve 12, the amount depending upon the relative proportions of the chamber 10 with the size and displacement of the piston 21, the arrangement illustrated being intended to admit a relatively small amount of syrup and not enough to fill the chamber 10 and the branch portion 20 when the pump is retracted. The amount of syrup taken in also depends upon the sensitivity of the valve 12, it being apparent that all of the chamber portion of the entire valve could be filled, if desired, by appropriately arranging the aforesaid controlling factors.

After withdrawing the pump handle as aforesaid, the operator then restores the handle to return the piston 21 toward the position shown in Fig. 2, wherein syrup will be confined to a smaller space and the end portion 29 of the operating member will approach the end 28a of the pressure valve stem, continued restorative movement of the pump rod causing portion 29 to push the valve stem 28 until carbonated water enters the mixing chamber through passage 32, whereupon the carbonated water will mix with the syrup and issue from the outfeed valve 17, depositing the mixture in the glass or receptacle 38. As heretofore mentioned, it is contemplated that the operating member 22—24 will, in most instances, be coin-controlled to prevent improper manipulation of the pump piston 21.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. A mixing valve including a reciprocable pump member and a plurality of infeed connections at least one of which is adapted to be connected with a source of fluid under pressure, valve means interposed between said mixing valve and the pressure infeed connection, spring means normally closing said last-mentioned valve means, a normally closed infeed valve interposed between another of said infeed connections and the mixing valve, said pump member being movable in one direction to reduce the pressure within said mixing valve to cause an influx of fluid from said last-mentioned valve means and being operable in an opposite direction to effect operative engagement with said pressure valve means to open the latter and permit entrance of fluid under pressure into the mixing valve, means providing an outfeed connection from said mixing valve and a normally closed outfeed valve interposed between the mixing valve and the outfeed connection, said outfeed valve being opened by pressure within the mixing valve resulting from admission of fluid from said pressure connection.

2. In a mixing valve, a mixing chamber, a pressure line connected with said chamber, a pressure valve normally closed between the pressure line and chamber, an infeed line communicating with said chamber, an outfeed line leading from said chamber, a normally closed infeed valve shutting off the infeed line and adapted to be opened by reduced pressure in said chamber, a normally closed outfeed valve in said outfeed line and adapted to be opened by a predetermined pressure within the chamber, and a pump member movable between opposite limits in said chamber, said pump member moving in one direction to reduce pressure within the chamber and effect opening of the infeed valve with a consequent influx of fluid, said pump member being movable in an opposite direction to engage and open said pressure valve to admit fluid under pressure, the combined fluids in said chamber issuing through said outfeed valve as a result of pressure resulting from opening of the pressure valve.

3. A mixing valve comprising a pump cylinder, a piston reciprocable in said cylinder, means for reciprocating said piston, oppositely disposed infeed and outfeed connections at a particular end of said cylinder constituting a mixing chamber, said piston being movable toward said chamber and connections to decrease the volumetric displacement thereof and movable in an opposite direction to increase said displacement and reduce the pressure in said chamber, infeed valve means at said infeed connection and operable by reduced pressure as aforesaid to admit a quantity of fluid, a pressure connection opposite said particular end of the cylinder between said infeed and outfeed connections, and pressure valve means including a valve member arranged to move into and out of closed position reciprocably in approximate alignment with the movement of said piston, spring means normally urging said pressure valve toward said piston to close off the pressure connection, and means on said piston moved into engagement with said pressure valve to open the same when the piston is moved a predetermined distance toward said particular end of the cylinder, and an outfeed valve normally closing off said outfeed connection and opened by pressure within said chamber resulting from the admission of fluid under pressure by said pressure valve.

4. A mixing valve comprising, in combination, a pump cylinder, a piston reciprocable in said cylinder, means providing a mixing chamber at an end of said cylinder, means for reciprocating said piston, infeed and outfeed connections with said chamber and provided with infeed and outfeed valve means respectively actuated by reduced and increased pressure within the chamber, a normally closed pressure valve opposite one of the terminal positions of said piston in said mixing chamber and adapted for connection with a source of fluid under pressure, said piston being moved in one direction away from said pressure valve to reduce pressure in said chamber and effect opening of said infeed valve, said piston being movable in an opposite direction toward said pressure valve and provided with means engaging the latter to open the same when the piston is moved a predetermined distance toward the mixing chamber after being moved to reduce pressure therein as aforesaid, whereby to open the pressure valve and admit fluid under pressure for actuation of said outfeed valve to permit egress of the combined fluids in said chamber under pressure from said source of fluid under pressure.

5. A mixing valve including a mixing chamber and means providing a fluid intake and a fluid exhaust opening, coacting infeed valve and pump means arranged in communicating with said chamber as a part of the mixing valve, said pump means including an operating member movable back and forth and arranged for movement in one direction to effect influx of fluid through said infeed valve means, and means providing a connection from said chamber with a source of fluid under pressure, together with normally closed pressure valve means coacting with said pump means and actuated when said pump operating member is moved a certain distance in an opposite direction to open said pressure valve and admit fluid under pressure for mixture with fluid from said infeed valve.

VIRGIL J. PHILIPPS.